US011016905B1

(12) United States Patent
Manzanares et al.

(10) Patent No.: US 11,016,905 B1
(45) Date of Patent: May 25, 2021

(54) STORAGE CLASS MEMORY ACCESS (71) Applicant: Western Digital Technologies, Inc., San Jose, CA (US)

(72) Inventors: Adam Manzanares, Union City, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 20 days.

(21) Appl. No.: 16/683,095

(22) Filed: Nov. 13, 2019

(51) Int. Cl.
*G06F 3/06* (2006.01)
*G06F 12/1009* (2016.01)
*G06F 12/0882* (2016.01)
*G06F 9/30* (2018.01)

(52) U.S. Cl.
CPC .......... *G06F 12/1009* (2013.01); *G06F 3/064* (2013.01); *G06F 3/0611* (2013.01); *G06F 3/0656* (2013.01); *G06F 3/0659* (2013.01); *G06F 3/0673* (2013.01); *G06F 9/3013* (2013.01); *G06F 9/30047* (2013.01); *G06F 12/0882* (2013.01)

(58) Field of Classification Search
CPC ...... G06F 3/0611; G06F 3/064; G06F 3/0659; G06F 3/0673; G06F 3/0656; G06F 2003/0691
See application file for complete search history.

(56) References Cited

U.S. PATENT DOCUMENTS

| 4,420,807 A | 12/1983 | Nolta et al. |
| 5,608,876 A | 3/1997 | Cohen et al. |
| 6,772,296 B1 * | 8/2004 | Mathiske ............... G06F 12/08 365/185.11 |
| 6,856,556 B1 | 2/2005 | Hajeck |
| 7,023,726 B1 | 4/2006 | Chen et al. |
| 7,126,857 B2 | 10/2006 | Hajeck |
| 7,216,211 B2 | 5/2007 | Munguia et al. |
| 7,386,655 B2 | 6/2008 | Gorobets et al. |

(Continued)

FOREIGN PATENT DOCUMENTS

WO    2012134641 A2    10/2012

OTHER PUBLICATIONS

Karypidis et al.; "The tangible file system"; 23rd International Conference on Distributed Computing Systems Workshops, 2003; Proceedings, Providence, Rhode Island, pp. 268-273.

(Continued)

*Primary Examiner* — Tracy A Warren
(74) *Attorney, Agent, or Firm* — Barry IP Law, P.C.

(57) ABSTRACT

A write request is received to write byte-addressable data corresponding to a first entry of a plurality of entries in a page table, and the byte-addressable data is written in a buffer of a host memory. A read request is received to read byte-addressable data corresponding to a second entry of the plurality of entries in the page table, and a read command is sent to a device using a memory device interface to read the byte-addressable data from a Storage Class Memory (SCM) of the device. According to another aspect, control circuitry of the device uses a block device interface for receiving commands from a host to read and write data in blocks in the SCM. The control circuitry also uses a memory device interface for receiving read commands from the host to read byte-addressable data from the SCM.

19 Claims, 7 Drawing Sheets

(56) References Cited

U.S. PATENT DOCUMENTS

| | | |
|---|---|---|
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,904,619 B2 | 3/2011 | Danilak |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,979,601 B2 | 7/2011 | Berenbaum et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | DeForest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,631,191 B2 | 1/2014 | Hashimoto |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,392 B1 | 5/2014 | Asnaashari et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,903,995 B1 | 12/2014 | Basak et al. |
| 8,947,803 B1 | 2/2015 | Yamakawa et al. |
| 9,015,123 B1 | 4/2015 | Mathew et al. |
| 9,116,800 B2 | 8/2015 | Post et al. |
| 9,189,387 B1 | 11/2015 | Taylor et al. |
| 9,342,453 B2 | 5/2016 | Nale et al. |
| 9,619,174 B2 | 4/2017 | Chen et al. |
| 9,836,404 B2 | 12/2017 | Ummadi et al. |
| 9,857,995 B1 | 1/2018 | Malina et al. |
| 10,126,981 B1 | 11/2018 | Malina et al. |
| 10,423,536 B2 | 9/2019 | Noguchi et al. |
| 10,482,009 B1 | 11/2019 | Sabol et al. |
| 10,496,544 B2 | 12/2019 | Wang et al. |
| 2008/0148048 A1* | 6/2008 | Govil ............... G06F 21/53 713/164 |
| 2010/0037002 A1 | 2/2010 | Bennett |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0166891 A1 | 6/2012 | Dahlen et al. |
| 2012/0210068 A1 | 8/2012 | Joshi et al. |
| 2012/0239860 A1 | 9/2012 | Atkisson et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0317377 A1 | 12/2012 | Palay et al. |
| 2012/0324191 A1 | 12/2012 | Strange et al. |
| 2012/0331016 A1 | 12/2012 | Janson et al. |
| 2013/0080687 A1 | 3/2013 | Nemazie et al. |
| 2013/0091321 A1 | 4/2013 | Nishtala et al. |
| 2013/0132638 A1 | 5/2013 | Horn et al. |
| 2013/0145106 A1 | 6/2013 | Kan |
| 2013/0205114 A1 | 8/2013 | Badam et al. |
| 2013/0290793 A1 | 10/2013 | Booth et al. |
| 2014/0006686 A1* | 1/2014 | Chen ............... G06F 12/1433 711/102 |
| 2014/0059405 A1 | 2/2014 | Syu et al. |
| 2014/0101369 A1 | 4/2014 | Tomlin et al. |
| 2014/0108703 A1 | 4/2014 | Cohen et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2014/0226389 A1 | 8/2014 | Ebsen et al. |
| 2014/0351515 A1 | 11/2014 | Chiu et al. |
| 2015/0058534 A1 | 2/2015 | Lin |
| 2015/0142996 A1 | 5/2015 | Lu |
| 2015/0302903 A1 | 10/2015 | Chaurasia et al. |
| 2015/0363320 A1 | 12/2015 | Kumar et al. |
| 2016/0027481 A1 | 1/2016 | Hong |
| 2016/0118130 A1 | 4/2016 | Chadha et al. |
| 2016/0313943 A1 | 10/2016 | Hashimoto et al. |
| 2016/0342357 A1 | 11/2016 | Ramamoorthy et al. |
| 2016/0357463 A1 | 12/2016 | DeNeui et al. |
| 2016/0378337 A1 | 12/2016 | Horspool et al. |
| 2017/0024332 A1 | 1/2017 | Rui et al. |
| 2017/0147499 A1 | 5/2017 | Mohan et al. |
| 2017/0160987 A1 | 6/2017 | Royer, Jr. et al. |
| 2017/0185347 A1 | 6/2017 | Flynn et al. |
| 2017/0228170 A1 | 8/2017 | Chen et al. |
| 2017/0270041 A1 | 9/2017 | Talagala et al. |
| 2017/0286291 A1 | 10/2017 | Thomas |
| 2018/0004438 A1* | 1/2018 | Hady ............... G06F 3/0619 |
| 2018/0032432 A1 | 2/2018 | Kowles |
| 2018/0095898 A1 | 4/2018 | Khosravi et al. |
| 2018/0150404 A1* | 5/2018 | Kim ............... G06F 12/0246 |
| 2018/0307620 A1 | 10/2018 | Zhou |
| 2018/0349041 A1* | 12/2018 | Zhou ............... G06F 12/0897 |
| 2019/0163375 A1* | 5/2019 | Amidi ............... G06F 9/30 |
| 2019/0188153 A1 | 6/2019 | Benisty et al. |

(56) References Cited

U.S. PATENT DOCUMENTS

2019/0310796 A1* 10/2019 Perez ............... G06F 11/1469
2019/0339904 A1    11/2019 Myran et al.
2019/0347204 A1* 11/2019 Du ................. G06F 12/0882

OTHER PUBLICATIONS

Seltzer et al.; "An NVM Carol: Visions of NVM Past, Present, and Future"; 2018 IEEE 34th International Conference on Data Engineering; Paris, 2018; pp. 15-23; available at: https://www.researchgate.net/publication/328522956_An_NVM_Carol_Visions_of_NVM_Past_Present_and_Future.

Xu et al.; "Cast: A page-level FTL with compact address mapping and parallel data blocks"; 2012 IEEEE 31st International Performance Computing and Communications Conference (IPCCC); Austin, TX; 2012; pp. 142-151; available at: https://ieeexplore.ieee.org/document/6407747.

Phil Mills, "Storage Class Memory—the Future of Solid State Storage," http://www.snia.org/sites/default/education/tutorials/2009/fall/solid/PhilMills_The_Future_of_Solid_State_Storage.pdf., SNIA Education, 2009.

Pending U.S. Appl. No. 16/176,997, filed Oct. 31, 2018, entitled "Tiered Storage Using Storage Class Memory", James N. Malina.

Pending U.S. Appl. No. 16/867,793, filed May 6, 2020, entitled "Page Modification Encoding and Caching", Cassuto et al.

Pending U.S. Appl. No. 16/196,077, filed Nov. 20, 2018, entitled "Data Access in Data Storage Device Including Storage Class Memory", Dubeyko et al.

Pending U.S. Appl. No. 16/246,425, filed Jan. 11, 2019, entitled "Container Key Value Store for Data Storage Devices", Sanjay Subbarao.

Pending U.S. Appl. No. 16/246,401, filed Jan. 11, 2019, entitled "Fine Granularity Translation Layer for Data Storage Devices", Sanjay Subbarao.

International Search Report and Written Opinion dated Nov. 6, 2020 from counterpart International Application No. PCT/US2020/037713, 8 pages.

Hitachi Vantara; "Hitachi Accelerated Flash 2.0"; Sep. 2018; 20 pages; available at: https://www.hitachivantara.com/en-us/pdfd/white-paper/accelerated-flash-whitepaper.pdf.

Kang et al.; "Subpage-based Flash Translation Layer for Solid State Drivers"; Jan. 2006; 10 pages; available at: https://cs.kaist.ac.kr/fileDownload?kind=tech&sn=340.

Kim et al.; "Partial Page Buffering for Consumer Devices with Flash Storage"; Proceedings 2013 IEEE 3rd International Conference on Consumer Electronics—Berlin, ICCE-Berlin 2013 (pp. 177-180); available at: https://hanyang.elsevierpure.com/en/publications/partial-page-buffering-for-consumer-devices-with-flash-storage.

Wu et al.; "Delta-FTL: Improving SSD Lifetime via Exploiting Content Locality"; Apr. 10-13, 2012; 13 pages; available at: https://cis.temple.edu/~he/publications/Conferences/DeltaFTL-Eurosys12.pdf.

Xia et al.; "Edelta: A Word-Enlarging Based Fast Delta Compression Approach"; Jul. 2015; 5 pages; available at: https://www.usenix.org/system/files/conference/hotstorage15/hotstorage15-xia.pdf.

Pending U.S. Appl. No. 16/921,719, filed Jul. 6, 2020, entitled "Data Access in Data Storage Device Including Storage Class Memory", Dubeyko et al.

* cited by examiner

| Virtual Address | Access | Phys. Address |
|---|---|---|
| A | Read-Only | SCM 1 |
| B | Read/Write | Mem. 1 |
| C | Read-Only | SCM 2 |
| D | Read/Write | Mem. 2 |
| ⋮ | ⋮ | ⋮ |

STORAGE CLASS MEMORY ACCESS

BACKGROUND

Storage Class Memory (SCM) has recently been developed as a non-volatile storage option that is capable of providing a fine granularity of data access (i.e., byte-addressable or cache line size). In addition, SCMs typically provide a shorter data access latency, as compared to traditional non-volatile storage devices, such as a Solid-State Drive (SSD) using flash memory or a Hard Disk Drive (HDD) using a rotating magnetic disk. SCM can include, for example, memories, such as a Magnetic Resistance Random Access Memory (MRAM), a Phase Change Memory (PCM), and a Resistive RAM (RRAM).

Although SCM can allow for byte-addressable access of data (i.e., in units less than a page size or a block size), the time to write data to SCM may be much longer than the time to read data from SCM. This has slowed the adoption of SCM as a more affordable and power efficient alternative to memories conventionally used for host memory, such as Dynamic Random Access Memory (DRAM) or Static Random Access Memory (SRAM).

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
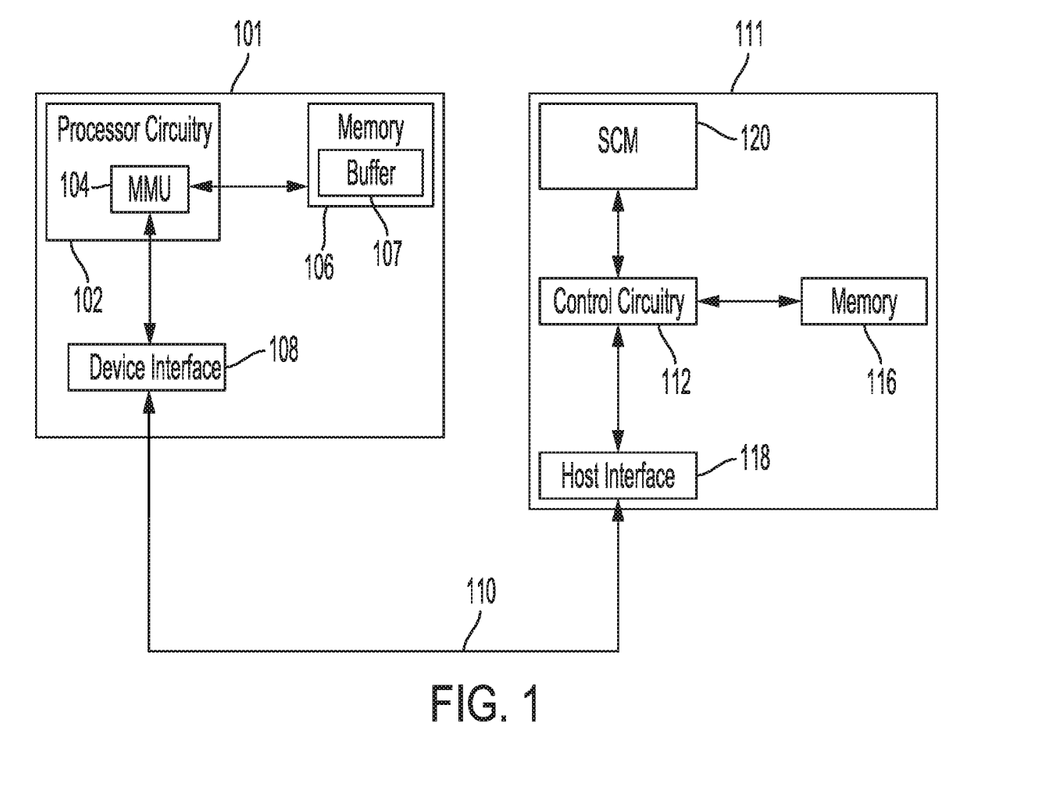
FIG. 1 is a block diagram of an example environment including a host and a device including a Storage Class Memory (SCM) according to one or more embodiments.

FIG. 1 is a block diagram of an example environment including host 101 and device 111 according to one or more embodiments. Host 101 communicates with device 111 to retrieve data from and store data in device 111. As further described below, device 111 can serve as a memory device and/or as a storage device for host 101 via respective device interfaces. Host 101 and device 111 may be separate devices or may be housed together as part of a single electronic device, such as, for example, a server, computing device, embedded device, desktop, laptop or notebook computer or another type of electronic device such as a tablet, smartphone, network media player, portable media player, television, digital camera, or Digital Video Recorder (DVR). In other implementations, host 101 may be a client computer or a storage controller, and device 111 may be a memory/storage server or memory/storage node in a network, such as in a cloud storage network or data center. As used herein, a host can refer to a device that is capable of issuing commands to a device to store data or retrieve data. In this regard, host 101 may include another storage device such as a smart data storage device that is capable of executing applications and communicating with other memory/storage devices.

As shown in FIG. 1, device 111 includes Storage Class Memory (SCM) 120 that provides non-volatile storage of data that can be accessed at a byte level (i.e., at a cache line size) that is less than a page size or a block size. SCM 120 can include, for example, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), Fast NAND, and/or 3D-XPoint memory. Such SCMs provide for faster reading and writing of data than conventional non-volatile storage, such as flash memory or a rotating magnetic disk. In some implementations, device 111 may also include other types of non-volatile storage in addition to SCM 120, such as a rotating magnetic disk or flash memory.

Although SCM can provide faster reading and writing of data than conventional forms of non-volatile storage, SCM generally takes longer for writing data than for reading data. This can be especially apparent in cases where address indirection is used in the SCM, such as for wear leveling. As noted above, the longer write latency of SCMs can prevent the use of SCM as a replacement for volatile local memory, such as more expensive and greater power consuming Dynamic Random Access Memory (DRAM) or Static Random Access Memory (SRAM). According to one aspect of the present disclosure, a Base Address Register (BAR) is exposed by device 111 to host 101 so that read commands may be sent for byte-addressable data (e.g., for cache lines or less than a page size or block size) using a memory device interface, while write commands are sent from host 101 using a block device interface for writing data in larger blocks of data. As discussed in more detail below, data to be written in SCM 120 can be aggregated or modified in buffer 107 of memory 106 of host 101 before being flushed to SCM 120. Host 101 can then send a write command for writing the aggregated or modified block of data in SCM 120. This arrangement reduces the latency for reading and writing data in SCM 120 so that SCM 120 can be used for storing byte-addressable data that would otherwise be stored in memory 106.

In the example of FIG. 1, host 101 includes processor circuitry 102 for executing computer-executable instructions, such as an Operating System (OS) of host 101. Processor circuitry 102 can include circuitry such as one or more processors for executing instructions and can include, for example, a Central Processing Unit (CPU), a Graphics Processing Unit (GPU), a microcontroller, a Digital Signal Processor (DSP), an Application Specific Integrated Circuit (ASIC), a Field Programmable Gate Array (FPGA), hard-wired logic, analog circuitry and/or a combination thereof. In some implementations, processor circuitry 102 can include a System on a Chip (SoC). In this regard, the example of FIG. 1 shows Memory Management Unit (MMU) 104 as being part of processor circuitry 102 or included in the same casing as processor circuitry 102. Those of ordinary skill in the art will appreciate that processor circuitry 102, memory 106, and/or device interface 108 may be combined into a single component or casing in some implementations. Other implementations may not include an MMU. As used herein, an MMU can be considered processor circuitry.

In the example of FIG. 1, processor circuitry 102 can access memory 106 via MMU 104 to execute instructions, such as instructions for executing a block device interface or a memory device interface used to read data from or write data to device 111. In this regard, and as discussed in more detail below, buffer 107 of memory 106 can store byte-addressable data for write requests that are aggregated or buffered to reach a block size for SCM 120.

Memory 106 serves as a main memory for host 101 and can include, for example, a volatile RAM such as DRAM or SRAM, a non-volatile RAM, or other solid-state memory. While the description herein refers to solid-state memory generally, it is understood that solid-state memory may comprise one or more of various types of memory devices such as flash integrated circuits, C-RAM, PC-RAM or PRAM, Programmable Metallization Cell RAM (PMC-RAM or PMCm), OUM, RRAM, NAND memory (e.g., Single-Level Cell (SLC) memory, Multi-Level Cell (MLC) memory (i.e., two or more levels), or any combination thereof), NOR memory, EEPROM, FeRAM, MRAM, other discrete Non-Volatile Memory (NVM) chips, or any combination thereof. In some implementations, memory 106 may be located external to host 101, but used as a main memory for host 101.

Processor circuitry 102 also uses MMU 104 to access SCM 120 of device 111 via device interface 108. In some implementations, MMU 104 can access a page table that translates virtual addresses used by processor circuitry 102 into physical addresses (e.g., byte addresses) indicating a location of where data for the virtual addresses are to be stored in or retrieved from memory 106 or SCM 120. In this regard, MMU 104 may keep track of the locations for byte-addressable data. In addition, MMU 104 may execute a memory device interface (e.g., memory device interface 10 in FIG. 2) for accessing byte-addressable data.

Device interface 108 allows host 101 to communicate with device 111 via bus or interconnect 110. In some implementations, device interface 108 may communicate with host interface 118 of device 111 via bus or interconnect 110 using a standard, such as Peripheral Component Interconnect express (PCIe), Ethernet, or Fibre Channel. As discussed in more detail below, bus or interconnect 110 can include a bus or interconnect that can allow commands for both byte-addressable data with a memory device interface and block-addressable data with a block device interface. In other embodiments, host 101 and device 111 may communicate via two or more buses or interconnects, each providing a memory device interface, a block device interface, or both.

In this regard, processor circuitry 102 uses a plurality of logical interfaces for reading data from and writing data to SCM 120 of device 111. For writing data and reading block-addressable data, host 101 interfaces with device 111 using a block device or storage device interface such as, for example, Non-Volatile Memory express (NVMe) that may be implemented, for example, by an OS driver executed by processor circuitry 102. For reading byte-addressable data, host 101 interfaces with device 111 using a memory device interface, such as a PCIe Base Address Register (BAR) interface, Gen-Z, Open Coherent Accelerator Processor Interface (OpenCAPI), or Cache Coherent Interconnect for Accelerators (CCIX), that may be executed by processor circuitry 102. In some implementations, the memory device interface may be implemented by MMU 104, or by other circuitry of processor circuitry 102, such as a hardware accelerator.

As shown in FIG. 1, device 111 includes host interface 118, control circuitry 112, memory 116, and SCM 120. Host interface 118 allows device 111 to communicate with device interface 108 of host 101 via bus or interconnect 110. Host interface 118, in some implementations, may communicate with device interface 108 of host 101 using a standard, such as PCIe, Ethernet, or Fibre Channel.

In addition, control circuitry 112 uses a plurality of logical interfaces for receiving and performing read and write commands from host 101 to access data in SCM 120. For reading and writing block-addressable data, control circuitry 112 interfaces with host 101 using a block device interface, which may include, for example, an NVMe interface. For reading byte-addressable data, control circuitry 112 interfaces with host 101 using a memory device interface. The memory device interface may include, for example, a PCIe BAR interface, Gen-Z, OpenCAPI, or CCIX.

Control circuitry 112 can include circuitry such as one or more processors for executing instructions and can include, for example, a CPU, a GPU, a microcontroller, a DSP, an ASIC, an FPGA, hard-wired logic, analog circuitry and/or a combination thereof. In some implementations, control circuitry 112 can include an SoC such that one or both of host interface 118 and memory 116 may be combined in a single chip with control circuitry 112. As with processor circuitry 102 of host 101 discussed above, control circuitry 112 of device 111 in some implementations can include separate components, such as separate hardware accelerators for implementing a memory device interface and a block device interface.

Memory 116 of device 111 can include, for example, a volatile RAM such as DRAM, a non-volatile RAM, or other solid-state memory. Control circuitry 112 can access memory 116 to execute instructions, such as a firmware of device 111 that can include instructions for implementing the memory device interface and the block device interface. In addition, control circuitry 112 may access memory 116 for data used while executing a firmware of device 111, data to be written in SCM 120, and/or data that has been read from SCM 120.

Those of ordinary skill in the art will appreciate that other implementations can include more or less than the elements shown in FIG. 1, and that the processes discussed herein can be implemented in other environments. For example, other environments may not include an MMU in host 101, may include a separate MMU or hardware accelerator for implementing a memory device interface, or can include a different number of SCMs or different types of non-volatile storage in device 111 in addition to SCM 120.

Figure 2:
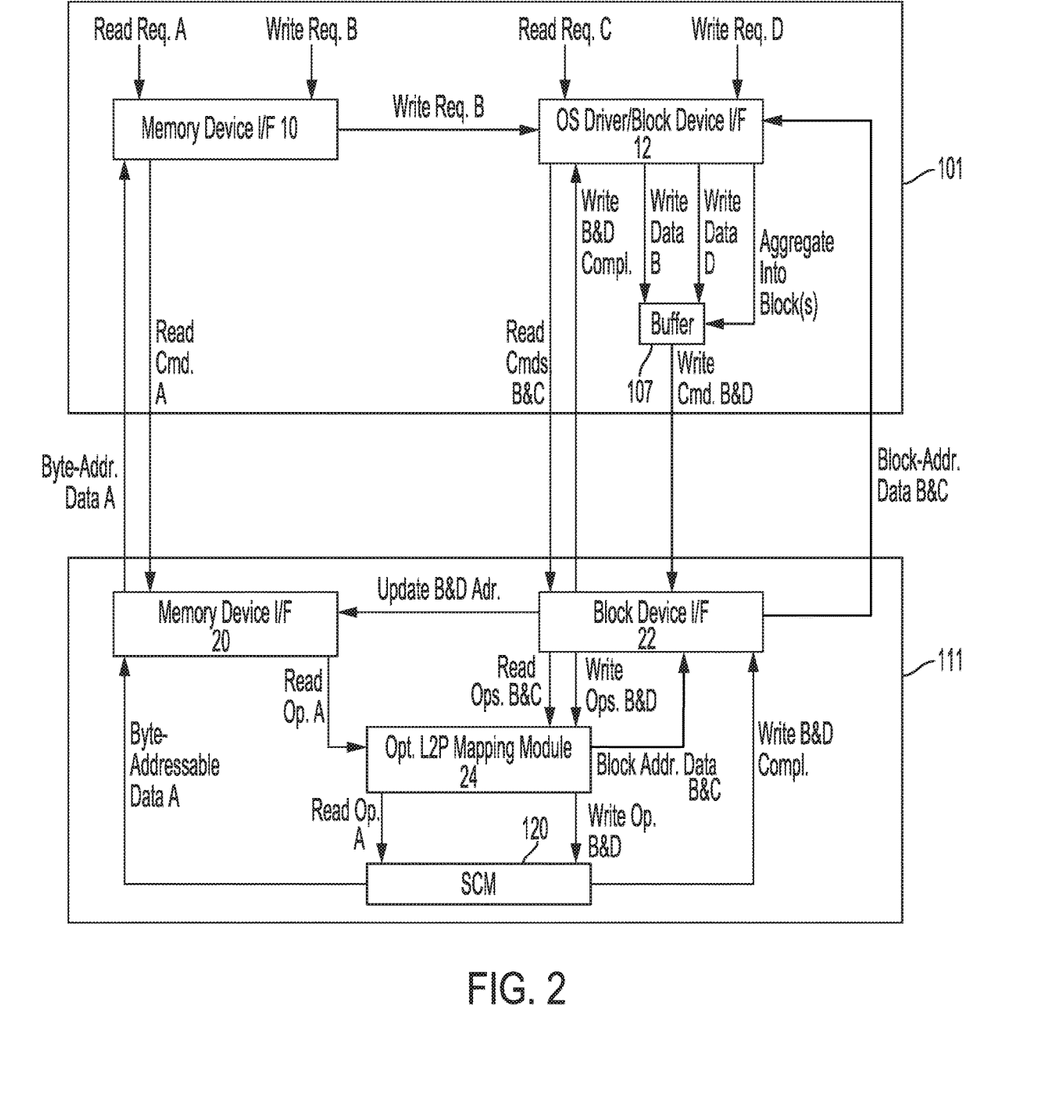
FIG. 2 is a block diagram showing the handling of read requests and write requests according to one or more embodiments.

FIG. 2 is an example block diagram showing the handling of read requests and write requests by host 101 and device 111 according to one or more embodiments. As shown in FIG. 2, memory device interface 10 receives read request A and write request B, while block device interface 12 receives read request C and write request D. The read and write requests can come from applications executed by processor circuitry 102. In the example of FIG. 2, memory device interface 10 is implemented by MMU 104 of processor circuitry 102 and block device interface 12 is implemented by an OS driver of host 101 executed by processor circuitry 102.

Write request B is initially received by memory device interface 10, but is redirected by memory device interface 10 to block device interface 12, since memory device interface 10 is only used for handling read requests for byte-addressable data, as opposed to write requests. In some implementations, MMU 104 hands control of the write request to an OS of host 101 since the memory mapping to SCM 120 is marked as read-only. As noted above, SCM 120 generally performs read commands faster than write commands. In the present disclosure, SCM 120 can serve as a local memory or a partial DRAM replacement for host 101 for read requests, while write requests are performed in memory 106 of host 101. This ordinarily allows for a smaller sized local memory at host 101, which can reduce power consumption and the cost of the overall system including host 101 and device 111.

As used herein, read and write requests refer to data accesses made at a byte-level (i.e., byte-addressable data), such as cache line requests made by applications executed by processor circuitry 102 of host 101. On the other hand, read and write commands refer to commands sent to device 111 from host 101 to access data either at a byte-level in the case of read commands from memory device interface 10, or at a block-level (i.e., page or block-addressable data) from block device interface 12. A page size or block size can correspond to a unit of data in a virtual memory that is managed by an OS of host 101. Data accessed in device 111 by block device interfaces 12 and 22 in FIG. 2 is read and written in units of this page or block size. Some examples of a block or page size can include 512 bytes, 4 KB, 8 KB, 2 MB, or 4 MB. In contrast, byte-addressable data accessed by memory device interfaces 10 and 20 in FIG. 2 allow data to be read in units of a byte, including the reading of a single byte of data from SCM 120 of device 111.

As shown in FIG. 2, read request A for byte-addressable data A is repackaged by memory device interface 10 as read command A, which is sent to memory device interface 20 of device 111 to retrieve byte-addressable data A from SCM 120. Memory device interface 20 at device 111 receives read command A and uses optional logical-to-physical mapping module 24 to identify a physical address in SCM 120 storing byte-addressable data A. In other implementations, logical-to-physical mapping module 24 may be omitted, such as in implementations where SCM 120 does not use address indirection for memory techniques such as, for example, wear-leveling to more evenly distribute writing throughout SCM 120. In such implementations, memory device interface 20, which may be executed by control circuitry 112 in FIG. 1, can perform read operation A in SCM 120. In performing read operation A, byte-addressable data A is returned to memory device interface 20 and may be temporarily stored in a buffer, such as a buffer in memory 116 of device 111 in FIG. 1, before being returned to memory device interface 10 of host 101 to complete read command A.

Memory device interface 20 executed by control circuitry 112 of device 111 is configured to only receive and perform read commands for byte-addressable data. The performance of write commands received by memory device interface 20 may be blocked or trigger an error at device 111. Such errors may or may not be reported back to host 101.

In the example of FIG. 2, write request B is received by memory device interface 10 of host 101. In some cases, write request B can include a request to store byte-addressable data, such as data from a cache flush command to flush one or more cache lines from a cache or caches of processor circuitry 102 of host 101 (e.g., from an L1/L2/L3 cache). In other cases, write request B can include a request to store block or page-addressable data, such as data from an application executed by processor circuitry 102. Memory device interface 10 identifies write request B as a write request, and in response, redirects write request B to block device interface 12. In some implementations, write requests received by memory device interface 10 can trigger a fault handler that allows the OS of host 101 via block device interface 12 to handle the write request.

In the case where write request B is to store byte-addressable data, block device interface 12 uses buffer 107 to aggregate or modify one or more portions of the block of data including the byte-addressable data to be written to SCM 120. Block device interface 12 sends a read command for the block of data including the byte-addressable data to be written to device 111. Block device interface 22 of device 111 receives the read command for the block and performs a read operation on SCM 120 and returns the read block including the byte-addressable data to block device interface 12 of host 101. Block device interface 12 buffers the read block of data in buffer 107 and modifies one or more byte-addressable portions of the buffered block for write request B. In some cases, additional write requests for byte-addressable data included in the buffered block may also be performed while the block is stored in buffer 107.

Block device 12 then sends a write command for the modified block including the byte-addressable data to flush the data for write request from buffer 107 to SCM 120. In some cases, the write command may include additional blocks that have been modified or written, such as data for write request D. Block device interface 22 of device 111 receives the write command, and uses optional logical-to-physical mapping module 24 to identify one or more physical addresses in SCM 120 storing one or more blocks including data B and D for write requests B and D. As noted above, logical-to-physical mapping module 24 may be omitted in other implementations, such as where SCM 120 does not use address indirection. In such implementations, block device interface 22, which may be executed by control circuitry 112 in FIG. 1, can identify one or more addresses in SCM 120 for performing write operations B and D. In performing write operations B and D, block device interface 22 stores one or more blocks of data including data B and data D in SCM 120. In addition, block device interface 22 may update byte-addresses used by memory device interface 20 for data included in the one or more blocks of data with the locations where the data has been written in SCM 120.

One or more write completion indications are returned to block device interface 22 after completing the write operations. Block device interface 22 may forward or send a write completion indication to block device interface 12 of host 101 to indicate that the write command or write commands have been completed and may also provide the new byte-addressable physical addresses for data stored in the write operations in addition to block-addressable locations for the data. In other implementations, memory device interface 20 may instead provide the updated byte-addressable physical addresses to memory device interface 10 of host 101.

Read request C is also received by block device interface 12 of host 101. The data to be retrieved for read request C is addressed in terms of pages or blocks, as opposed to being a request for byte-addressable data, such as with read request A discussed above. Block device interface 12 repackages the request as read command C and sends read command C to block device interface 22 of device 111. For its part, block device interface 22 performs read command C by using optional logical-to-physical mapping module 24, which provides a physical address for reading block-addressable data C from SCM 120. Block-addressable data C is read from SCM 120 and returned to block device interface 22, which passes the data on to block device interface 12 of host 101 to complete the command. In some cases, data C may be buffered in a memory of device 111, such as memory 116, before sending the data to host 101.

As will be appreciated by those of ordinary skill in the art, other implementations can include different components or modules than those shown in the example of FIG. 2. For example, other implementations may not include logical-to-physical mapping module 24, such that memory device interface 20 and block device interface 22 access SCM 120 without using a logical-to-physical mapping module.

Page Table Examples

Figure 3:
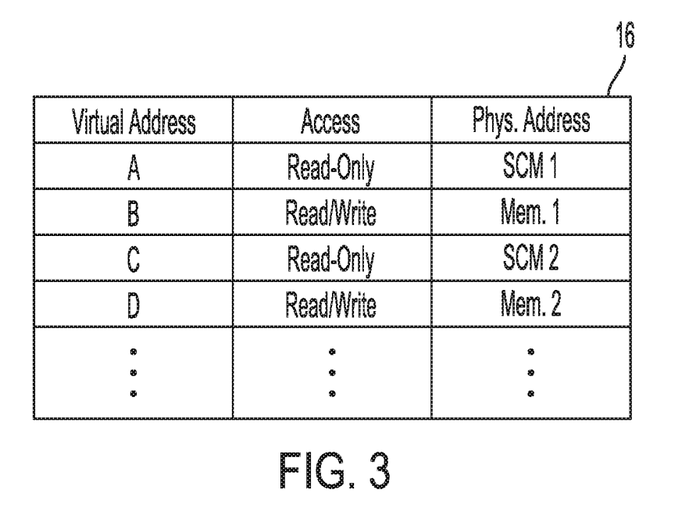
FIG. 3 is an example of a page table according to one or more embodiments.

FIG. 3 is an example of page table 16 according to one or more embodiments. Page table 16 may be created, for example, by processor circuitry 102 of host 101 executing memory device interface 10 in FIG. 2. In some implementations, processor circuitry 102 may maintain multiple page tables, such as those for mapping virtual addresses for byte-addressable data and also for mapping virtual addresses for block-addressable data. In addition, those of ordinary skill in the art will appreciate that page table 16 may include other information than shown in the example of FIG. 3, such as, for example, statistics information. Page table 16 may be stored, for example, in memory 106 of host 101 or in a memory of MMU 104 or other memory of processor circuitry 102.

As shown in FIG. 3, virtual addresses are assigned to different data accessed by processor circuitry 102 and page table 16 indicates a type of access for the data and a physical address where the data is stored in either memory 106 or SCM 120 of device 111. For example, byte-addressable data for virtual addresses A and C in page table 16 is stored in SCM 120 at physical addresses SCM 1 and SCM 2, respectively. The data for virtual addresses A and C is also indicated in page table 16 as having read-only access. In this regard, memory device interface 20 of device 111 in some implementations may expose a read-only Base Address Register (BAR) to memory device interface 10 of host 101. The access for the byte-addressable data represented in page table 16 is initially read-only, and remains read-only until the data is written to or otherwise modified.

In some implementations, memory device interface 20 of device 111 may expose a portion of the BAR as a readable and writable address range that maps to a memory of device 111, such as memory 116 in FIG. 1. In such implementations, the portion of the BAR that maps to SCM 120 can remain read-only, while the portion of the BAR exposed to host 101 that maps to memory 116 can allow byte-addressable writes and reads via memory device interface 10 of host 101. This read/write portion of the BAR mapped to memory 116 can include, for example, a battery-backed or power fail-safe volatile DRAM, or portion thereof, to effectively provide non-volatile storage or non-volatile memory. For example, the read/write portion of the BAR mapped to memory 116 may be protected from data loss due to power interruption with a capacitor or battery that may allow control circuitry 112 to transfer data from the BAR mapped portion of memory 116 to SCM 120 after a loss in power at device 111.

In the example of FIG. 3, after a write request has been received for data represented in page table 16, such as for virtual addresses B and D, the data for the write request is stored in buffer 107 of memory 106. This is indicated in the example of FIG. 3 where the allowed access for virtual addresses B and D is read/write and the physical addresses storing this data is indicated as Mem. 1 and Mem. 2, respectively, in memory 106. Memory device interface 10 in FIG. 2 can update page table 16 after byte-addressable data included in the pages or blocks corresponding to virtual addresses B and D have been rewritten or modified in buffer 107 of memory 106. If needed, byte-addressable data included in the buffered pages or blocks can be modified in buffer 107 or read from buffer 107 by the same application that issued an original write request for the data or by a different application. As discussed in more detail below with reference to FIG. 4, the state of such data remains read/write until the data is flushed from buffer 107 to SCM 120.

Figure 4:
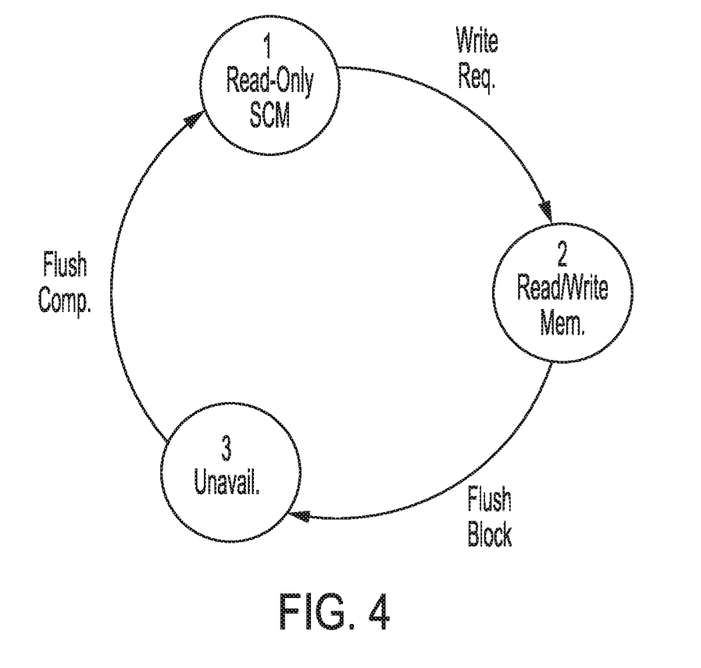
FIG. 4 is a state diagram for a page table entry according to one or more embodiments.

FIG. 4 is a state diagram for a page table entry in page table 16 of FIG. 3, such as an entry for one of virtual addresses A, B, C, or D according to one or more embodiments. As shown in FIG. 4, the entry begins in an initial state with read-only access for a physical address in SCM 120. The physical address may correspond to an address of a BAR provided by device 111 to memory device interface 10 of host 101. This allows memory device interface 10 to directly access the address in SCM 120 to read data without using an OS of host 101.

The entry moves to the second state after a write request is received for the data represented by the entry. As discussed above, the write request can be handled as a software event by memory device interface 10 and/or block device interface 12. This ordinarily allows for more flexibility in the design and implementation of host-side buffering than hardware solutions that may rely exclusively on MMU 104.

In the second state, a block or page including the data for the write request has been retrieved by block device interface 12 of host 101 and stored in buffer 107 of memory 106 in host 101. The prior or obsolete version of the block may remain in SCM 120, but the modified block or page in buffer 107 is the current or valid version of the data for the virtual address. Memory device interface 10 or block device interface 12 also updates page table 16 to change the access to read/write and to map the virtual address for the entry to the physical address where the data has been written in buffer 107 of memory 106.

In some implementations, memory device interface 10 or block device interface 12 may identify that there have been no previous writes to the block or page or that the write request is the first write to the block or page. In such implementations, the data to be written for the block or page may be stored in buffer 107 without first retrieving the block or page from device 111. The write request is then performed on the buffered block or page.

While the entry is in the second state, the block or page for the entry stored in memory 106 can be modified or overwritten by the same application that issued the write request or by a different application. Data corresponding to the entry, such as byte-addressable data within the buffered block or page, can also be read from the physical address in memory 106 while the entry is in the second state. Memory device interface 10 may refer to the entry in page table 16 in response to read and write requests to modify or read the byte-addressable data corresponding to the virtual address that is stored in memory 106. Temporarily storing the data in memory 106 can ordinarily allow for a faster write operation than would be possible by writing the data to SCM 120. In this regard, the buffering of the modified byte-addressable data in memory 106 can be advantageous when the buffered data is soon reused, since it can also be quickly read from memory 106. Data buffered in memory 106 may also be read quicker than data read from SCM 120. This can be especially beneficial for cache lines, which are often read or modified soon after an initial write.

In addition, the aggregation or modification of data in memory 106 and using a separate block device interface to flush an aggregated or modified block of data in one write operation is more efficient than making numerous smaller write operations in SCM 120, which has a greater write latency than its read latency. The foregoing use of both a block device interface and a memory device interface with page table 16, and the buffering of written data in buffer 107, can also provide a more efficient arrangement than switching access of a BAR of SCM 120 from read-only to read/write or switching or temporarily modifying a single interface of SCM 120 to accommodate byte-addressed and block-addressed data. Deferring writes to SCM 120 can improve performance of the system including host 101 and device 111 by allowing the writes to occur more quickly in memory 106 of host 101, and writing the aggregated or modified blocks to SCM 120 at a later time when write latency to SCM 120 is less critical for processes or threads being executed by processor circuitry 102 that may need to wait until the data has been written before continuing execution.

After the data for the entry has been modified or aggregated into one or more blocks by block device interface 12, the data for the entry is flushed or de-staged by block device interface 12 from buffer 107 to SCM 120 via block device interface 22 of device 111. Block device interface 12 of host 101 updates the entry so that access to the virtual address is unavailable or blocked while the data is being flushed to SCM 120. In some implementations, indicating in the page table that the virtual address is unavailable can include removing or deleting an entry for the virtual address or marking the entry unavailable or obsolete. This can ensure consistency of the data so that different applications are not modifying data in memory 106 before access of the flushed data in SCM 120 is returned to read-only, which could result in reading an old or obsolete version of the data. The use of memory 106 to temporarily buffer write requests provides an asynchronous storage of data where the writing of the data to SCM 120 is deferred to improve system performance in terms of Input/Output Operations Per Second (10PS), while the foregoing use of access permissions in page table 16 allows for the data to remain consistent.

As shown in FIG. 4, the entry returns to the first state of read-only access in SCM 120 after the flush or de-staging operation has completed. In some implementations, block device interface 22 of device 111 returns a command completion indication to block device interface 12 of host 101 to indicate the completion of the flush command. As discussed above with reference to FIG. 2, block device interface 22 of device 111 may update memory device interface 20 of device 111 with the byte-addressable addresses for data written in SCM 120 for a write operation. Memory device interface 20 of device 111 may then update memory device interface 10 of host 101 with the new byte-addressable addresses for the flushed data so that memory device interface 10 can update the entries in the page table with the new addresses for the flushed data in SCM 120. In other implementations, block device interface 12 of host 101 may receive updated byte-addressable addresses from block device interface 22 of device 111, which block device interface 12 may use to update the page table.

Example Processes

Figure 5:
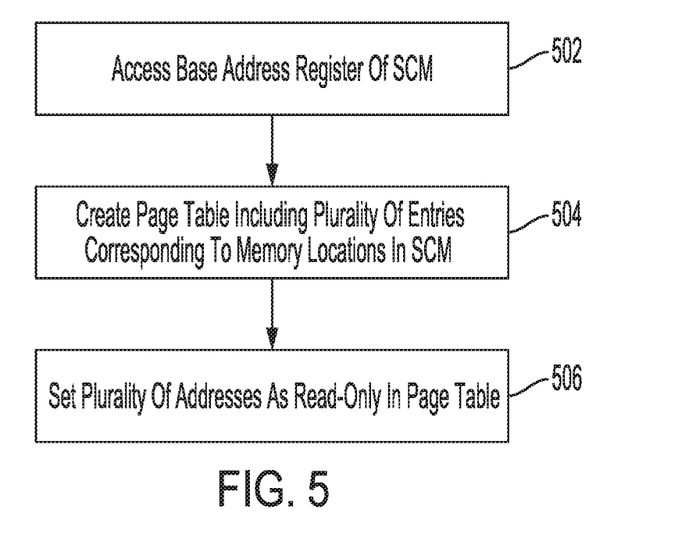
FIG. 5 is a flowchart for a page table creation process according to one or more embodiments.

FIG. 5 is a flowchart for a page table creation process according to one or more embodiments. The process of FIG. 5 may be performed by, for example, processor circuitry 102 of host 101 executing memory device interface 10.

In block 502, memory device interface 10 accesses the BAR of SCM 120. In some implementations, control circuitry 112 of device 111 executing memory device interface 20 may expose a read-only BAR of SCM 120 to memory device interface 10 of host 101. This allows memory device interface 10 to have size and data type information for SCM 120 for mapping virtual addresses of host 101 to physical addresses of SCM 120 and enable direct memory access of SCM 120 by host 101 for read operations. In addition, device 111 in some implementations may also expose a read/write portion of the BAR that maps to memory 116.

In block 504, memory device interface 10 creates a page table including a plurality of entries corresponding to memory locations in SCM 120. In more detail, the entries in the page table correspond to the exposed BAR of device 111. The page table can include entries for different virtual addresses and the mapped physical addresses in SCM 120. In this regard, the created page table can include entries for virtual addresses or pages that allow memory device 10 to determine a physical location in SCM 120 of device 111 for byte-addressable data that is smaller than a page or block size. The created page table can also include an indication of the allowed access for the physical address, as in the case of page table 16 discussed above with reference to FIG. 3.

In block 506, memory device interface 10 sets the plurality of entries in the page table as read-only. As discussed above, data can be read from SCM 120 much quicker than data of the same size can be written to SCM 120. The byte-addressable access to SCM 120 is therefore limited to read-only access. As discussed in more detail below with reference to FIG. 6, writes to SCM 120 are handled by block device interface 12 of host 101 so that data is more efficiently written to SCM 120 in units of a block size (e.g., 512 bytes, 4 KB, 8 KB, 2 MB, or 4 MB) instead of more numerous writes that are smaller than a block size, such as for a single byte of data. In addition, deferring writes to SCM 120 can improve performance of the system including host 101 and device 111 by allowing the writes to occur more quickly in memory 106 of host 101, and writing the aggregated or modified data to SCM 120 at a later time when the effect of the write latency of SCM 120 does not delay execution of a process or thread.

Figure 6:
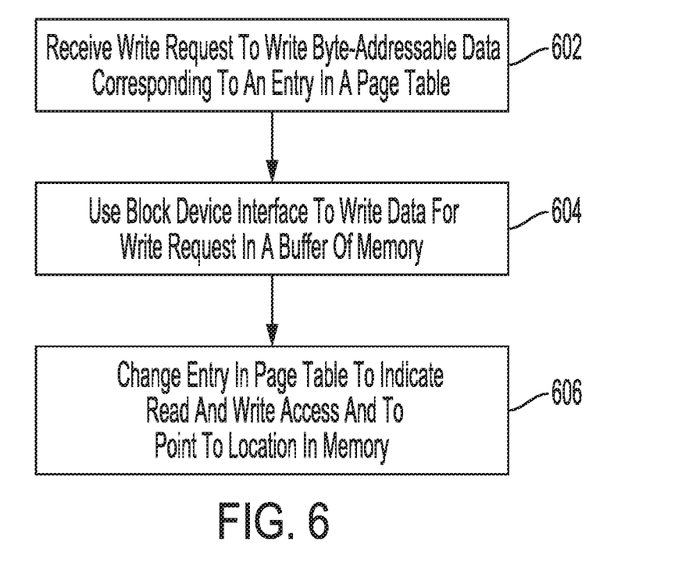
FIG. 6 is a flowchart for a write request process according to one or more embodiments.

FIG. 6 is a flowchart for a write request process according to one or more embodiments. The process of FIG. 6 may be performed by, for example, processor circuitry 102 of host 101 executing memory device interface 10 and block device interface 12.

In block 602, memory device interface 10 or block device interface 12 receives a write request to write data corresponding to an entry in a page table (e.g., page table 16 in FIG. 3). The write request may come from, for example, an application executed by processor circuitry 102. The write request is for data smaller than a page or block size and is therefore byte-addressable. In such cases, the write request may result from flushing or de-staging a cache of processor circuitry 102. For example, an L1, L2, or L3 cache of processor circuitry 102 may have one or more cache lines flushed or de-staged.

In block 604, data for the write request is written in buffer 107 of memory 106 of device 111 using block device interface 12. As discussed above, the write request to store byte-addressable data may be received by block device interface 12 of host 101 after redirection from memory device interface 10 or from another module, such as from a portion of an OS of host 101. For example, in cases where the write request is initially received by memory device interface 10, the write request may trigger a fault handler that redirects the write request to block device interface 12. As discussed above with reference to FIG. 2, block device interface 12 can also receive write requests for block-addressable data.

The byte-addressable data written in buffer 107 for the write request received in block 602 may be aggregated into units of a page or block size or a current version of the block or page including the byte-addressable data may be read from device 111 and stored in buffer 107 for performing the write request. As noted above, write operations take much longer to perform in SCM 120 than read operations for a given amount of data. Performing write requests in buffer 107 can result in performing less overall writes to SCM 120 and in completing the smaller intermediate writes faster in memory 106 to improve the efficiency and performance of host 101 and device 111. Write requests for data that is already in units of a block or page size may also be buffered in memory 106 in some implementations to improve the performance of write operations by reducing the latency of performing the write operations. As noted above, the faster completion of write requests can allow for processes and threads to continue execution rather than wait for data to be written to SCM 120. In other embodiments, block-addressable data may instead be written to SCM 120 without deferring the writing of such data to SCM 120 with the use of memory 106. Such an arrangement may be preferred in cases where the size of memory 106 is limited.

In block 606, block device interface 12 changes the entry for the virtual address in the page table from read-only access to both read and write access. Block device interface 12 also changes the entry for the first virtual address to point to a location or physical address in memory 106 where data for the first virtual address was written. As discussed above with reference to the page table entry state diagram of FIG. 4, the data buffered in memory 106 can be written and read in memory 106 until it is flushed or de-staged from memory 106 to SCM 120 in page-sized or block-sized units. The modification and flushing of data from memory 106 is discussed in more detail below with reference to the process of FIG. 8.

Figure 7:
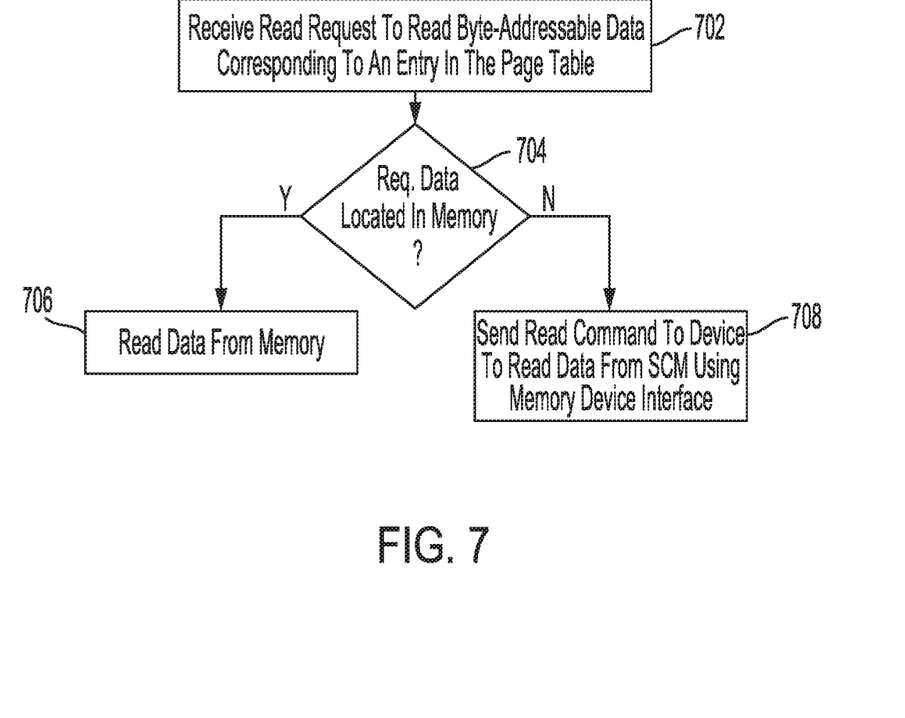
FIG. 7 is a flowchart for a read request process for byte-addressable data according to one or more embodiments.

FIG. 7 is a flowchart for a read request process for byte-addressable data according to one or more embodiments. The process of FIG. 7 may be performed by, for example, processor circuitry 102 of host 101 executing memory device interface 10.

In block 702, a read request is received by memory device interface 10 at host 101 to read byte-addressable data corresponding to an entry in a page table (e.g., page table 16 in FIG. 3). The read request may come from, for example, an application executed by processor circuitry 102. The read request can be for data smaller than a page or block size and is therefore byte-addressable. In some cases, the read request may result from a process or thread that is executed by processor circuitry 102 to load data into a cache of processor circuitry 102.

In block 704, memory device interface 10 uses a page table to determine whether the requested data is located in memory 106. If so, memory device interface 10 reads the data from memory 106 in block 706. On the other hand, if it is determined that the requested byte-addressable data is located in SCM 120, memory device interface 10 in block 708 sends a read request to memory device interface 20 of device 111 to directly access the requested data from SCM 120. Unlike data access performed by block device interface 12 of host 101, the read requests performed by memory device interface 10 of host 101 may not require use of the OS of host 101.

As discussed above, by allowing read-only access to a BAR of SCM 120, it is ordinarily possible to take advantage of the relatively quick read access of SCM 120 for byte-addressable data, without incurring the greater performance penalty of writing byte-addressable data to SCM 120. This can allow for a smaller main memory used by host 101 (e.g., memory 106) or a storage space savings for the host's main memory, which may be internal or external to host 101. As noted above, memory 106 can include a DRAM or SRAM in some implementations that can provide faster read and write access than SCM 120, but costs more and consumes more power for a given amount of data storage.

Figure 8:
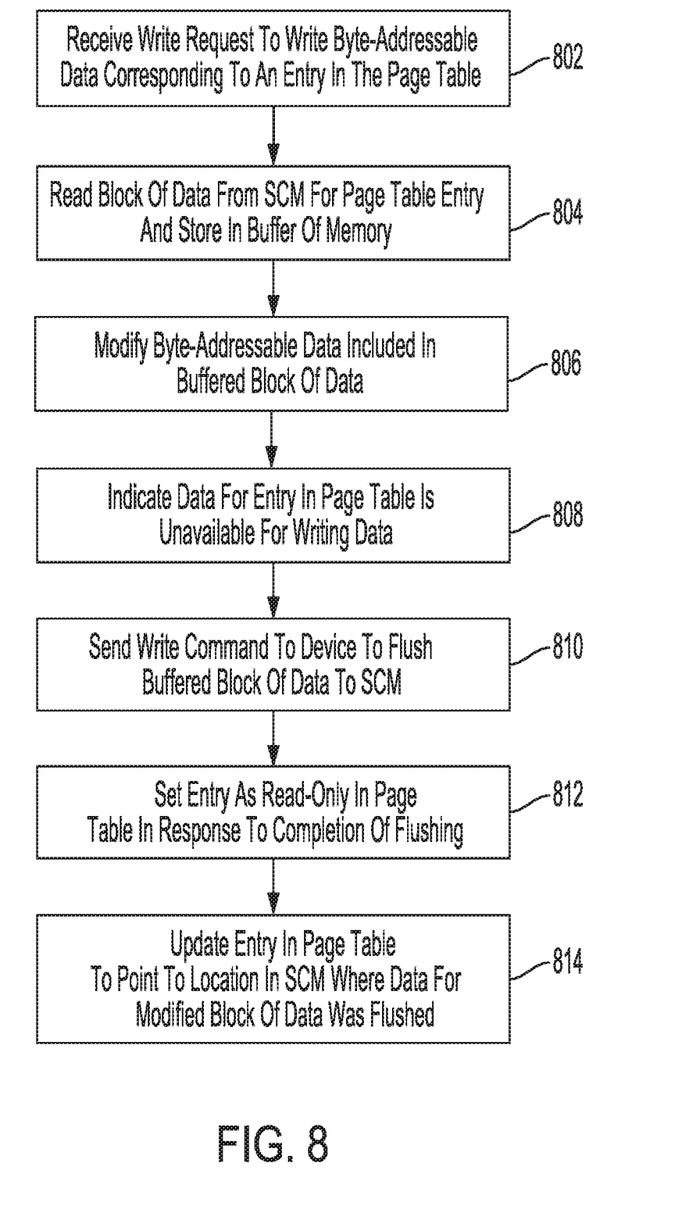
FIG. 8 is a flowchart for a flush process from a host memory to an SCM according to one or more embodiments.

FIG. 8 is a flowchart for a flush process from a local memory to an SCM according to one or more embodiments. The process of FIG. 8 may be performed by, for example, processor circuitry 102 executing block device interface 12.

In block 802, block device interface 12 receives a write request to write byte-addressable data corresponding to an entry in a page table. The byte-addressable data to be written can include data within a page or block represented by the page table entry. Such write data may come from, for example, processes or threads executed by processor circuitry 102 that may flush or de-stage dirty cache lines from a cache of processor circuitry 102.

In block 804, block device interface 12 reads a block of data from SCM 120 for the block or page of data represented by the page table entry. The block or page is stored in buffer 107 of memory 106. In addition, block device interface 12 updates the page table to indicate that an entry or virtual address for the buffered block or page has read/write access and that the data for the entry is located at a physical address in memory 106.

In block 806, block device interface 12 modifies the byte-addressable data for the write request by writing the data to the block or page buffered in buffer 107. As noted above, additional write requests and read requests may also be performed on the same byte-addressable data or on other byte-addressable portions of the buffered block or page while the block or page is stored in memory 106.

In block 808, block device interface 12 indicates in the page table that the data for the buffered block or page is unavailable for reading and writing data in preparation for flushing of the modified block to SCM 120. As noted above with respect to the state diagram of FIG. 4, indicating that data for the entry or virtual address is unavailable in the page table can help ensure consistency of the data by not allowing the data to be read or written while it is flushed to SCM 120.

In block 810, block device interface 12 sends a write command to device 111 to flush or de-stage the modified block of data from buffer 107 to SCM 120. In some implementations, block device interface 12 may wait until a threshold number of blocks have been aggregated in buffer 107 or may wait a predetermined amount of time with no accesses to the data in a block before flushing the modified block or blocks to SCM 120 via block device interface 22 of device 111. In other cases, block device interface 12 may flush an aggregated block of data in response to reaching a block's worth of data in buffer 107, such as when new write data is collected in buffer 107 for a page or block that has not been previously stored in device 111. In yet other implementations, the flushing of a block or blocks of data from buffer 107 may depend on a remaining storage capacity of buffer 107. For example, block device interface 12 may flush one or more blocks of data from buffer 107 in response to reaching 80% of the storage capacity of buffer 107.

In block 812, block device interface 12 sets the entry for the modified block of data as read-only in the page table in response to completion of the flushing operation. This corresponds to returning to the first state from the third state in the example state diagram of FIG. 4. The read-only access can correspond to a read-only BAR of SCM 120 used by memory device interface 10. The completion of the flushing operation may be determined by block device interface 12 based on the receipt of a command completion indication from block device interface 22 of device 111.

In block 814, block device interface 12 or memory device interface 10 updates the entry for the flushed block of data in the page table to point a location in SCM 120 where the block was flushed. In this regard, the new physical address of the data in SCM 120 may be received by block device interface 12 as part of the flush command completion indication or alternatively may be received by memory device interface 10 via an update process of memory device interface 20 of device 111.

Figure 9:
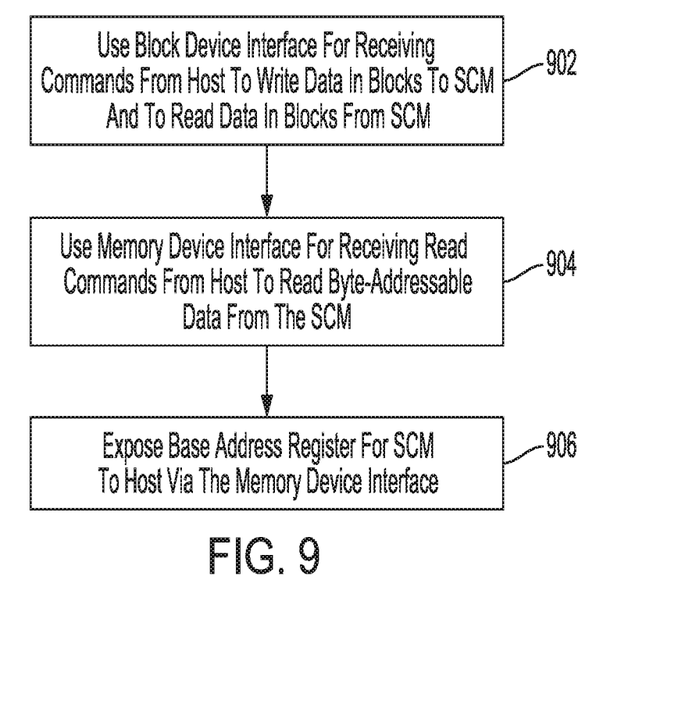
FIG. 9 is a flowchart for a multiple interface process for a device including an SCM according to one or more embodiments.

FIG. 9 is a flowchart for a multiple interface process of a device including SCM according to one or more embodiments. The process of FIG. 9 may be performed by, for example, control circuitry 112 of device 111.

In block 902, control circuitry 112 uses block device interface 22 for receiving write commands from host 101 to write data in blocks to SCM 120. As discussed above, block device interface 22 is also used to read block-addressable data from SCM 120.

In addition, control circuitry 112 uses memory device interface 20 in block 904 for receiving read commands from host 101 to read byte-addressable data from SCM 120. The use of two interfaces at device 111 allows SCM 120 to be used by host 101 as a main memory for reading byte-addressable data and as a non-volatile storage for blocks of data.

In block 906, memory device interface 20 exposes a read-only BAR for SCM 120 to host 101. As noted above, the exposed BAR for device 111 may also include a read/write portion located in memory 116 of device 111. The BAR may be exposed via, for example, a PCIe bus or interconnect that allows commands for byte-addressable data using a memory device interface, and also allows commands for block-addressable data using a block device interface, such as NVMe, for example. The use of a BAR can allow processor circuitry 102 at host 101 to create and update a page table that maps virtual addresses used by applications executed by processor circuitry 102 to physical addresses in SCM 120.

Figure 10:
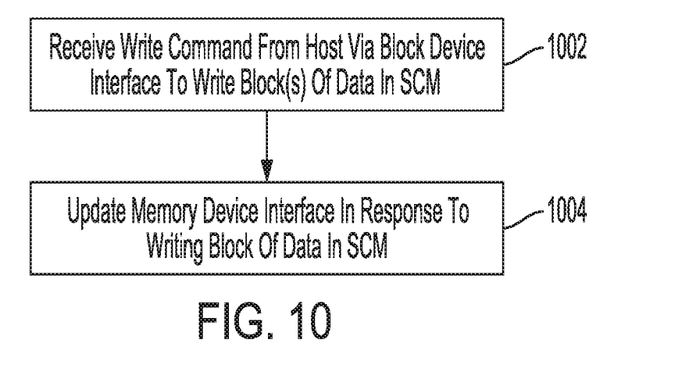
FIG. 10 is a flowchart for a block write process for a device including an SCM according to one or more embodiments.

FIG. 10 is a flowchart for a device block write process according to one or more embodiments. The process of FIG. 10 may be performed by, for example, control circuitry 112 of device 111.

In block 1002 of FIG. 10, control circuitry 112 of device 111 receives a write command from host 101 via block device interface 22 to write one or more blocks of data in SCM 120. In some implementations, control circuitry 112 may use a logical-to-physical mapping module to determine a location for writing the one or more blocks for the write command in a write operation sent to SCM 120. In other implementations, control circuitry 112 may not use such a logical-to-physical mapping module.

After receiving a confirmation of the completion of the write operation in SCM 120, control circuitry 112 updates memory device interface 20 in block 1004 with the physical addresses for the data written. In some implementations, the updated addresses are shared with host 101 via memory device interface 20 of device 111 so that memory device interface 10 at host 101 can update a page table.

As discussed above, the use of an SCM for reading byte-addressable data and writing to the SCM in blocks can allow the SCM replace at least some of a host's main memory, while reducing the effects of the greater write latency of the SCM. In addition, the use of the host's main memory for temporarily buffering byte-addressable data that has been modified and updating a page table for the buffered data can help ensure that an old or obsolete version of the data is not read from the SCM.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and control circuitry described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the circuitry may be any conventional processor, controller, microcontroller, or state machine. Processor or control circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or control circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor or control circuitry such that the circuitry can read information from, and write information to, the storage medium. In the alternative, the storage medium may be integral to processor or control circuitry. The circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A method for interfacing with a device including a Storage Class Memory (SCM), the method comprising:
   creating a page table including a plurality of entries corresponding to memory locations in the SCM of the device;
   setting the plurality of entries as read-only in the page table;
   receiving a write request to write byte-addressable data corresponding to a first entry of the plurality of entries;
   writing the byte-addressable data for the write request in a buffer of a memory of a host;
   receiving a read request to read byte-addressable data corresponding to a second entry of the plurality of entries;
   sending a read command to the device to read the byte-addressable data for the read request using a memory device interface; and
   redirecting the write request from the memory device interface to a block device interface for performance of the write request.

2. The method of claim 1, further comprising changing the first entry to indicate read and write access and to point to a location in the memory of the host where the byte-addressable data for the write request was written.

3. The method of claim 1, further comprising:
   reading a block of data for the first entry from the SCM;
   storing the read block of data in the buffer of the memory;
   modifying the block of data in the buffer to perform the write request; and
   sending a write command to the device using a block device interface to flush the modified block of data from the buffer of the memory of the host to the SCM.

4. The method of claim 3, further comprising:
   indicating that data for the first entry in the page table is unavailable for writing data in preparation for the flushing of the modified block of data to the SCM;
   setting the first entry as read-only in the page table in response to the completion of the flushing of the modified block of data to the SCM; and
   updating the first entry in the page table to point to a location in the SCM where the modified block of data was flushed.

5. The method of claim 1, wherein the memory device interface accesses a Base Address Register (BAR) of the SCM to read data from the SCM.

6. The method of claim 1, wherein the write request is performed in the buffer of the memory using an Operating System (OS) and the read command is sent to the device using the memory device interface without using the OS.

7. The method of claim 1, further comprising communicating with the device using Peripheral Component Interconnect express (PCIe) via the memory device interface and a block device interface.

8. A device, comprising:
   a Storage Class Memory (SCM) for storing data; and
   control circuitry configured to:
     use a block device interface for receiving write commands from a host and writing data in blocks to the SCM and for receiving read commands from the host and reading data in blocks from the SCM; and
     use a memory device interface for receiving read commands from the host and reading byte-addressable data from the SCM; and
     wherein the block device interface and the memory device interface access the same SCM.

9. The device of claim 8, wherein the control circuitry is further configured to expose a Base Address Register (BAR) of the device to the host via the memory device interface.

10. The device of claim 8, wherein the control circuitry is further configured to:
    receive a write command from the host via the block device interface to write a block of data in the SCM; and
    update addresses used by the memory device interface for byte-addressable data included in the block of data written in the SCM.

11. The device of claim 8, wherein the control circuitry is further configured to block performance of a write command received via the memory device interface.

12. The device of claim 8, wherein the control circuitry is further configured to communicate with the host using Peripheral Component Interconnect express (PCIe) via the memory device interface and the block device interface.

13. A host, comprising:
    a memory for storing data; and
    processor circuitry configured to:
      receive a write request to write data corresponding to a first entry of a plurality of entries in a page table;
      write data for the write request in a buffer of the memory using an Operating System (OS) of the host;
      receive a read request to read data corresponding to a second entry of the plurality of entries in the page table; and
      send a read command to a device using a memory device interface without using the OS to read the data for the read request from a Storage Class Memory (SCM) of the device.

14. The host of claim 13, wherein the processor circuitry is further configured to change the first entry in the page table to indicate read and write access and to point to a location in the memory where data for the write request was written.

15. The host of claim 13, wherein the processor circuitry is further configured to:
   read a block of data for the first entry from the SCM;
   store the read block of data in the buffer of the memory;
   modify the block of data in the buffer to perform the write request; and
   send a write command to the device using a block device interface to flush the modified block of data from the buffer of the memory to the SCM.

16. The host of claim 13, wherein the processor circuitry is further configured to:
   indicate that the first entry in the page table is unavailable for writing data in response to preparing to flush the modified block of data to the SCM;
   set the first entry as read-only in the page table in response to the completion of the flushing of the modified block of data to the SCM; and
   update the first entry in the page table to point to a location in the SCM where the modified block of data was flushed.

17. The host of claim 13, wherein the processor circuitry is further configured to redirect the write request from the memory device interface to a block device interface for performance of the write request.

18. The host of claim 13, wherein the memory device interface accesses a Base Address Register (BAR) of the SCM to read data from the SCM.

19. A device, comprising:
   a Storage Class Memory (SCM) for storing data; and
   control circuitry configured to:
      use a block device interface for receiving write commands from a host to write data in blocks to the SCM and for receiving read commands from the host to read data in blocks from the SCM;
      use a memory device interface for receiving read commands from the host to read byte-addressable data from the SCM; and
      block performance of a write command received via the memory device interface.

* * * * *